United States Patent
Koo et al.

(10) Patent No.: US 10,942,862 B2
(45) Date of Patent: Mar. 9, 2021

(54) CONTROLLER FOR MINIMIZING FLUSHING OPERATIONS FOR MAPPING TABLE, MEMORY SYSTEM AND OPERATING METHOD THEREOF

(71) Applicant: SK hynix Inc., Gyeonggi-do (KR)

(72) Inventors: Duck Hoi Koo, Gyeonggi-do (KR);
Soong Sun Shin, Gyeonggi-do (KR);
Sang Hyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 7 days.

(21) Appl. No.: 16/397,041

(22) Filed: Apr. 29, 2019

(65) Prior Publication Data

US 2020/0057728 A1 Feb. 20, 2020

(30) Foreign Application Priority Data

Aug. 14, 2018 (KR) .................. 10-2018-0095131

(51) Int. Cl.
| | |
|---|---|
| *G06F 12/10* | (2016.01) |
| *G06F 12/1009* | (2016.01) |
| *G06F 13/28* | (2006.01) |
| *G06F 1/26* | (2006.01) |
| *G06F 12/0875* | (2016.01) |

(52) U.S. Cl.
CPC .......... *G06F 12/1009* (2013.01); *G06F 1/266* (2013.01); *G06F 12/0875* (2013.01); *G06F 13/28* (2013.01); *G06F 2212/657* (2013.01)

(58) Field of Classification Search
CPC ... G06F 12/1009; G06F 12/0875; G06F 13/28
See application file for complete search history.

(56) References Cited

U.S. PATENT DOCUMENTS

| | | | | |
|---|---|---|---|---|
| 6,256,749 B1 * | 7/2001 | Kakuta | ............... | G06F 11/1076 711/161 |
| 8,621,133 B1 * | 12/2013 | Boyle | ..................... | G06F 3/064 711/4 |
| 8,930,583 B1 * | 1/2015 | Shapira | ................. | G06F 3/0659 710/5 |
| 8,966,176 B2 * | 2/2015 | Duzly | ..................... | G06F 12/08 711/115 |
| 9,836,108 B2 | 12/2017 | Kojima et al. | | |
| 2003/0233525 A1 * | 12/2003 | Reeves | ............... | G06F 11/1441 711/162 |
| 2007/0150662 A1 * | 6/2007 | Hara | ................... | G06F 12/0862 711/137 |
| 2007/0174504 A1 * | 7/2007 | Tseng | ..................... | G06F 13/28 710/22 |
| 2007/0174602 A1 * | 7/2007 | Kao | ........................ | G06F 9/4403 713/2 |

(Continued)

*Primary Examiner* — Ryan Bertram
(74) *Attorney, Agent, or Firm* — IP & T Group LLP

(57) ABSTRACT

A memory system includes a memory device comprising a plurality of memory cells storing data, and configured to perform one or more of a write operation, read operation and erase operation on the plurality of memory cells; and a controller configured to control an operation of the memory device, wherein the controller is configured to: cache a logical block addressing (LBA) mapping table from the memory device when the memory system is powered on by driving power applied thereto; and transfer a direct memory access (DMA) setup to a host when the LBA mapping table is cached.

16 Claims, 9 Drawing Sheets

(56) References Cited

U.S. PATENT DOCUMENTS

| | | | | |
|---|---|---|---|---|
| 2009/0292865 A1* | 11/2009 | Hong | ............... | G06F 3/0659 |
| | | | | 711/103 |
| 2014/0149608 A1* | 5/2014 | Shim | ............... | G06F 13/28 |
| | | | | 710/5 |
| 2014/0293712 A1* | 10/2014 | Kim | ............... | G06F 3/0688 |
| | | | | 365/189.05 |
| 2016/0070336 A1* | 3/2016 | Kojima | ............... | G06F 12/0246 |
| | | | | 711/103 |
| 2017/0109042 A1* | 4/2017 | Ke | ............... | G06F 12/0246 |
| 2018/0113629 A1* | 4/2018 | Kim | ............... | G06F 3/0659 |
| 2018/0329818 A1* | 11/2018 | Cheng | ............... | G06F 11/3037 |
| 2019/0121726 A1* | 4/2019 | Hsu | ............... | G06F 12/0253 |
| 2019/0129839 A1* | 5/2019 | Kim | ............... | G06F 3/0656 |
| 2020/0057572 A1* | 2/2020 | Lin | ............... | G06F 3/064 |

* cited by examiner

CONTROLLER FOR MINIMIZING FLUSHING OPERATIONS FOR MAPPING TABLE, MEMORY SYSTEM AND OPERATING METHOD THEREOF

CROSS-REFERENCES TO RELATED APPLICATION

The present application claims priority under 35 U.S.C. § 119(a) to Korean application number 10-2018-0095131, filed on Aug. 14, 2018, which is incorporated herein by reference in its entirety.

BACKGROUND

1. Technical Field

Various embodiments generally relate to a controller, a memory system and an operating method thereof, and more particularly, to a technique capable of minimizing a flushing operation when a safe shutdown occurs.

2. Related Art

In general, a memory device may include a volatile memory which loses data stored therein when power supply is cut off and a nonvolatile memory which retains data stored therein even when power supply is cut off. A data processing system including such a memory device requires a controller for controlling the memory device according to a request such as a write, read or erase request from an external host device. Furthermore, due to the physical characteristic of memory cells in which data are stored, the memory device has a physical limit to the number of operations including a write operation for storing data, a read operation for reading stored data, and an erase operation for erasing stored data. Such a limit is referred to as the endurance of the memory device. In a round-robin journaling method, when a safe shutdown occurs after booting of a memory system, a part of a logical block addressing (LBA) mapping table may be changed to flush the entire LBA mapping table. In this case, since the erase/write (E/W) count of the memory device is increased, the endurance of the memory device may be affected.

SUMMARY

Various embodiments are directed to a technique capable of effectively extending the lifetime of a memory device by minimizing the number of flushing operations for an LBA mapping table.

In an embodiment, a memory system includes a memory device including a plurality of memory cells storing data, and configured to perform one or more of a write operation, read operation and erase operation on the plurality of memory cells; and a controller configured to control an operation of the memory device, wherein the controller is configured to: cache a logical block addressing (LBA) mapping table from the memory device when the memory system is powered on by driving power applied thereto; and transfer a direct memory access (DMA) setup to a host when the LBA mapping table is cached.

In an embodiment, an operating method for a memory system having a controller, includes: powering on the memory system as driving power is applied; caching, by the controller, an LBA mapping table from an LBA mapping table storage region to a memory when the memory system is powered on; and transferring, by the controller, a DMA setup to a host when the LBA mapping table is cached.

In an embodiment, an operating method of a controller for controlling an operation of a memory device, the method includes: caching a logical block addressing (LBA) mapping table from the memory device in response to a command from a host upon being powered on; and ignoring the command without flushing the cached LBA mapping table for a power-off when a safe shutdown occurs before providing a direct memory access (DMA) setup to the host.

When a safe shutdown occurs before the transfer of the DMA setup, the command received from the host may be aborted.

When no safe shutdown occurs before the transfer of the DMA setup, the command received from the host may be executed, and a flushing operation for the LBA mapping table may be performed.

The flushing operation for the LBA mapping table may be performed through a round-robin journaling method.

The command received from the host may include a command which accompanies a change of the LBA mapping table.

The command received from the host may include a write command, trim command or the like.

DETAILED DESCRIPTION

The present disclosure may be modified in various manners and have various embodiments. Thus, specific embodiments will be described in detail with the reference to the accompanying drawings. However, the present disclosure is not limited to the specific embodiments, but may include all modifications, equivalents and substitutions without departing the sprit and scope of the present invention. Moreover, detailed descriptions related to publicly known functions or configurations will be ruled out in order not to unnecessarily obscure subject matters of the present disclosure. Furthermore, singular forms used in this specification and claims should be analyzed as including "one or more" components unless referred to the contrary.

Hereafter, exemplary embodiments will be described in detail with reference to the accompanying drawings. When the embodiments are described with reference to the accompanying drawings, the same or corresponding components are denoted by like reference numbers, and the duplicated descriptions will be omitted herein.

Figure 1:
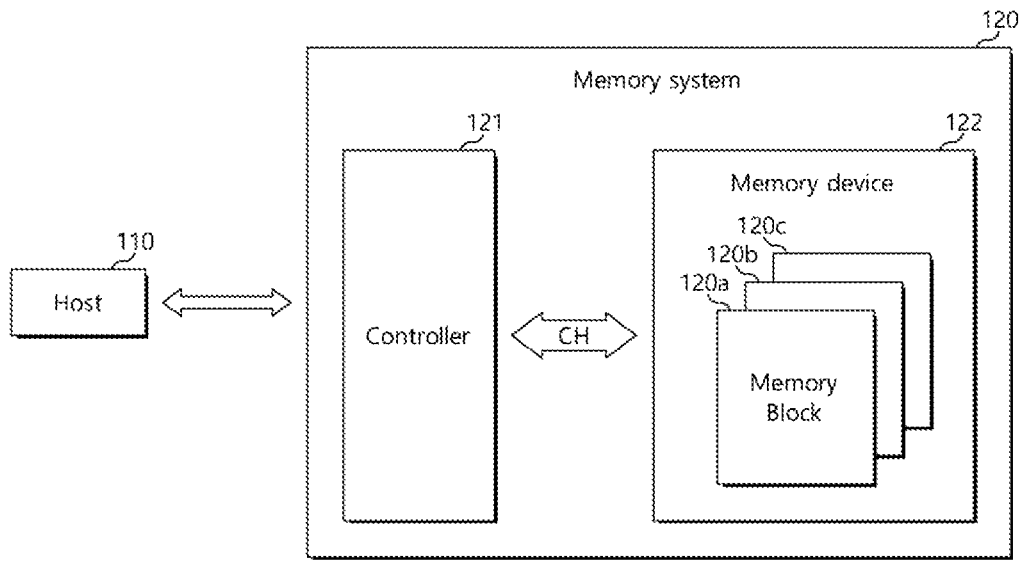
FIG. 1 is a block diagram of a data processing system in accordance with an embodiment.

FIG. 1 is a configuration diagram of a data processing system 100 in accordance with an embodiment.

Referring to FIG. 1, the data processing system 100 in accordance with the present embodiment may include a host 110 and a memory system 120.

The host 110 may request the memory system 120 to perform overall operations required for processing data, and receive the operation results from the memory system 120. The processing of the data may include writing, reading and erasing data.

The host 110 may include wired/wireless electronic devices such as a portable electronic device (for example, a mobile phone, MP3 player, laptop computer or the like), desktop computer, game machine, TV and projector.

The host 110 may include one or more operating systems (OS) such as Windows, Chrome and Linux, in order to provide functions and operations corresponding to the usage purpose of a user who uses the data processing system, and the use of the data processing system. Since the above-described configuration is only an example of the host 110 for promoting understandings of the data processing system, it is obvious that the host 110 in accordance with the present embodiment is not limited to the configuration.

The memory system 120 may perform an operation corresponding to a request of the host 110 and other overall operations required for maintaining the memory system 120. For this operation, the memory system 120 may include a controller 121 for controlling overall operations of the memory system 120 and a memory device 122 for performing an operation based on a control command of the controller 121 and other overall operations required for maintaining the memory system 120, and the controller 121 and the memory device 122 may be coupled through one or more channels CH. The controller 121 and the memory device 122 will be described below in detail with reference to FIGS. 2 to 10.

When the memory system 120 is powered on by driving power applied thereto after normal turn-off, the memory system 120 may start a booting operation. The memory system 120 may be ready to receive a command from the host 110 by loading firmware required for driving, and transfer a ready signal to a host 110 in order to inform the host 110 that the memory system 120 is ready. The memory system 120 may receive a command from the host 110. The memory system 120 may cache a LBA mapping table. When the caching of the LBA mapping table is completed, the memory system 120 may transfer a direct memory access (DMA) setup to the host 110. The memory system 120 may check whether a safe shutdown occurs.

In an embodiment, when a safe shutdown occurs before the transfer of the DMA setup is completed, the memory system 120 may not perform a flushing operation on the cached LBA mapping table. Specifically, when a safe shutdown occurs before the transfer of the DMA setup is completed, the memory system 120 may abort a command received from the host 110, or not execute the command. In this case, since the LBA mapping table is not changed, the memory system 120 may not flush the LBA mapping table to the memory device 122. The memory device 122 includes a plurality of memory blocks, for example, 120a, 120b, and 120c.

In an embodiment, when a safe shutdown occurs after the transfer of the DMA setup is completed, the memory system 120 may perform a flushing operation on the cached LBA mapping table. Specifically, when a safe shutdown occurs after the transfer of the DMA setup is completed, the memory system 120 may execute a command received from the host 110. In this case, since the LBA mapping table may be changed, the memory system 120 may flush the LBA mapping table to the memory device 122.

The memory system 120 may be configured as a PCM-CIA (Personal Computer Memory Card International Association) card, CF (Compact Flash) card, smart media card, memory stick, various multimedia cards (MMC, eMMC, RS-MMC and MMC-micro), SD (Secure Digital) card (SD, Mini-SD or Micro-SD), UFS (Universal Flash Storage), SSD (Solid State Drive) or the like.

Since the above-described configuration is only an example for promoting understandings of the memory system 120, it is obvious that the memory system 120 is not limited to the configuration.

Figure 2:
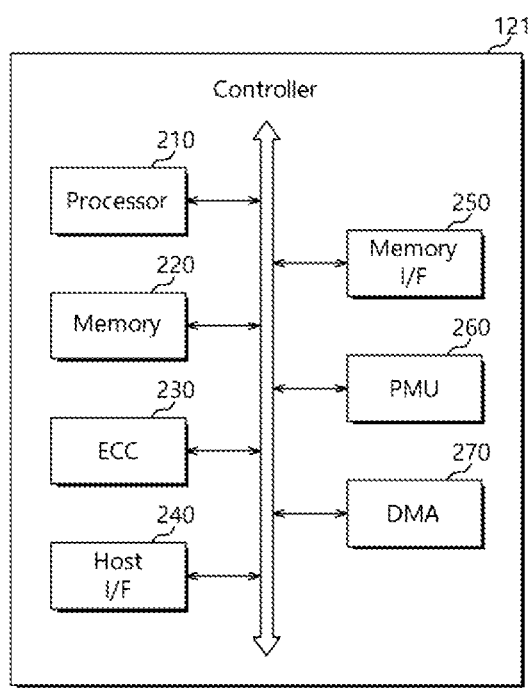
FIG. 2 is a block diagram of a controller in accordance with the present embodiment.

FIG. 2 is a block diagram of the controller in accordance with the present embodiment.

Referring to FIG. 2, the controller 121 in accordance with the present embodiment may include a processor 210, a memory 220, an error correction code (ECC) circuit 230, a host interface (I/F) 240, a memory I/F 250, a power management unit (PMU) 260, and a DMA 270.

The processor 210 may control overall operations of the memory system 120. Specifically, when a request such as a write, read or erase request is received from the host 110, the processor 210 may control components of the controller 121 and operations of the memory device 122 and the like, in order to perform an operation corresponding to the received request.

In an embodiment, the processor 210 may control the memory system 120 to start a booting operation when the memory system 120 is powered on by driving power applied thereto after normal turn-off. Under control of the processor 210, the memory system 120 may become ready to receive a command from the host 110 by loading firmware required for driving, and transfer a ready signal to host 110 in order to inform the host 110 that the memory system 120 is ready. The processor 210 may control the memory system 120 to receive a command from the host 110. The memory system 120 may control the memory system 120 to cache an LBA mapping table. When the caching of the LBA mapping table is completed, the processor 210 may control the memory system 120 to transfer a DMA setup to the host 110. The processor 210 may check whether a safe shutdown occurs.

In an embodiment, when a safe shutdown occurs before the transfer of the DMA setup is completed, the processor 210 may control the memory system 120 not to perform a flushing operation on the cached LBA mapping table. Specifically, when a safe shutdown occurs before the transfer of the DMA setup is completed, the processor 210 may control the memory system 120 to abort a command received from the host 110, or not to execute the command. In this case, since the LBA mapping table is not changed, the processor 210 may control the memory system 120 not to flush the LBA mapping table to the memory device 122.

In an embodiment, when a safe shutdown occurs after the transfer of the DMA setup is completed, the processor 210 may control the memory system 120 to perform a flushing operation on the cached LBA mapping table. Specifically, when a safe shutdown occurs after the transfer of the DMA setup is completed, the processor 210 may control the memory system 120 to execute a command received from the host 110. In this case, since the LBA mapping table may be changed, the processor 210 may control the memory system 120 to flush the changed LBA mapping table to the memory device 122.

In an embodiment, the processor 210 may drive firmware referred to as a flash translation layer (FTL) in order to control overall operations of the memory system 120.

In an embodiment, the processor 210 may be implemented as a microprocessor or central processing unit (CPU).

The memory 220 may serve as a working memory of the controller 121, the memory device 122 and the like. At this time, the memory 220 may store data required for driving the controller 121 and the memory device 122. That is, the memory 220 may serve as a working memory for storing data required for driving the memory system 120, the controller 121 and the like. Specifically, the memory 220 may store data received from the memory device 122 into the host 110, in order to perform an operation requested from the host 110, such as a write, read or erase operation. For this operation, the memory 220 may be configured as a program memory, data memory, write buffer/cache, read buffer/cache, data buffer/cache, map buffer/cache or the like.

In an embodiment, the memory 220 may be implemented as a volatile memory. For example, the memory 220 may be implemented as a static random access memory (SRAM) or dynamic random access memory (DRAM).

The ECC 230 may correct an error of data processed by the memory system 120.

In an embodiment, the ECC 230 may include an ECC encoder (not illustrated) for performing error correction encoding on data to be stored in the memory device 122 during a write operation and an ECC decoder (not illustrated) for performing error correction decoding on data received from the memory device 122 during a read operation. The ECC encoder may generate a parity bit by performing error correction encoding on the data to be stored in the memory device 122, and add the generated parity bit to the data to be stored in the memory device 122. At this time, the memory device 122 may store the data having the parity bit added thereto. The ECC decoder may detect an error by performing error correction decoding on the data received from the memory device 122 based on the parity bit, and correct the detected error. At this time, when the number of error bits included in the detected error exceeds the limit of the error correction ability of the ECC decoder, the ECC decoder cannot correct the detected error, and thus may output an error correction fail signal.

In an embodiment, the ECC 230 may perform hard decision and soft decision on data received from the memory device 122. The hard decision may indicate a method for correcting an error of the data received from the memory device 122, using only error correction codes and data which are read according to the on/off characteristic of a memory cell when a predetermined reference read voltage is applied (hereafter, referred to as hard decision data). The soft decision may indicate a method for correcting an error of the data received from the memory device 122, using additional information on the reliability of the hard decision data (hereafter, referred to as reliability data) in addition to the hard decision data and the error correction codes. The ECC 230 may perform both or any one of the hard decision and soft decision on the data received from the memory device 122.

Furthermore, when an error is not corrected through the hard decision performed on the data received from the memory device 122, the ECC 230 may perform the soft decision.

In an embodiment, the ECC 230 may correct an error of the data received from the memory device 122, using coded modulation such as an low density parity check (LDPC) code, Bose, Chaudhri, Hocquenghem (BCH) code, turbo code, Reed-Solomon code, convolution code, recursive systematic code (RSC)), trellis-coded modulation (TCM) or Block coded modulation (BCM).

The host I/F 240 may enable data communication between the memory system 120 and the host 110. Specifically, the host I/F 240 may receive a request such as a write, read or erase request from the host 110, and transfer data corresponding to the received request to the host 110. For this operation, the host 110 may be driven based on firmware referred to as a host interface layer (HIL).

In an embodiment, the host I/F 240 may be implemented as Universal Serial Bus (USB), Multi-Media Card (MMC), Peripheral Component Interconnect-Express (PCI-e or PCIe), Serial-attached SCSI (SAS), Serial Advanced Technology Attachment (SATA), Parallel Advanced Technology Attachment (PATA), Small Computer System Interface (SCSI), Enhanced Small Disk Interface (ESDI), Integrated Drive Electronics (IDE), Mobile Industry Processor Interface (MIPI) or the like, according to a communication protocol which is defined to transfer data to the host 110 or receive data from the host 110.

The memory I/F 250 may enable data communication between the controller 121 and the memory device 122. Specifically, the memory I/F 250 may transfer data to the memory device 122, the data including data required for processing a request such as a write, read or erase request received from the host 110 and other data required for maintaining the memory system 120. Then, the memory I/F 250 may receive data corresponding to the transferred data from the memory device 122. For this operation, the memory I/F 250 may be driven through firmware referred to as a flash interface layer (FIL).

The PMU 260 may manage driving power required for driving the memory system 120. Specifically, the PMU 260 may receive driving power from a battery or an external device such as the host 110, and distribute the received driving power to operate the respective units of the memory system 120. Furthermore, the PMU 260 may include a capacitor or battery for storing driving power to normally operate the memory system 120 even in case of a sudden power-off. At this time, the memory system 120 may be powered on by the received driving power, and start a booting operation for driving.

The DMA 270 may control the entire DMA operation through which the host 110 directly accesses the memory 220 to read or write data. Specifically, the DMA 270 may start preparing for the DMA operation, under control of the processor 210. When the preparation for the DMA operation is completed, the DMA 270 may transfer the DMA setup to the host 110. Then, the DMA 270 may transfer data read from the memory device 122 to the memory 220 or the data buffer, and transfer the data, which are stored in the memory 220 or the data buffer, to the host 110. Furthermore, the DMA 270 may transfer the data received from the host 110 to the memory 220 or the data buffer, and transfer the data, which are stored in the memory 220 or the data buffer, to the memory device 122. The DMA 270 includes all circuits, systems, software, firmware and devices necessary for their respective operations and functions.

Figure 3A:
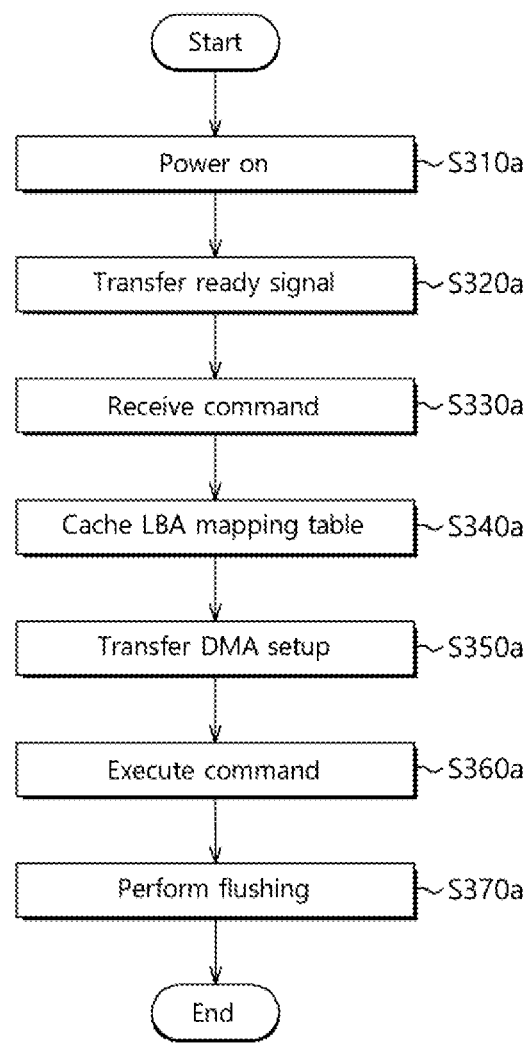
FIG. 3A is a flowchart illustrating an operating method for a memory device in accordance with an embodiment.

FIG. 3A is a flowchart illustrating an operating method of the memory system 120 in accordance with an embodiment.

In the following descriptions, the case in which the operating method is performed by the memory system 120 will be exemplified. Obviously, however, the operating method may be performed by the controller 121 or the processor 210.

Referring to FIG. 3A, the memory system 120 may be powered on at step S310a. Specifically, when the memory system 120 is powered on by driving power applied thereto, the memory system 120 may start a booting operation.

In an embodiment, the driving power applied to the memory system 120 may be applied from the PMU within the memory system 120.

In an embodiment, the driving power applied to the memory system 120 may be applied from an external device such as the host 110.

At step S320a, a ready signal may be transferred to the host 110. Specifically, after the memory system 120 is powered on, the memory system 120 may load firmware required for driving, and start the booting operation. When the memory system 120 is ready to receive a command from the host 110, the memory system 120 may transfer the ready signal to the host 110 in order to inform the host 110 that the memory system 120 is ready.

At step S330a, a command may be received from the host 110. Specifically, the memory system 120 may receive a command from the host 110. When the command is received from the host 110, the memory system 120 may start preparing for the execution of the received command.

In an embodiment, the command received from the host 110 may change the LBA mapping table. For example, the memory system 120 may receive a write command, trim command or the like from the host 110.

At step S340a, the LBA mapping table may be cached to the memory 220. Specifically, the LBA mapping table stored in the memory system 120 may be cached to the memory 220 of the controller 121.

In an embodiment, when the command is received from the host 110, the memory system 120 may perform an operation of caching the LBA mapping table.

In an embodiment, the memory system 120 may cache the entire LBA mapping table to the memory 220 of the controller 121.

In an embodiment, the memory system 120 may cache the LBA mapping table from an LBA mapping table storage region of the system region of the memory device 122 to the memory 220 of the controller 121.

At step S350a, a DMA setup may be transferred to the host 110. Specifically, when the LBA mapping table is cached to the memory of the controller 121, the memory system 120 may transfer the DMA setup to the host 110 in order to receive data corresponding to the command received from the host 110. The memory system 120 may receive the data corresponding to the command from the host 110.

At step S360a, the command may be executed. Specifically, when the command and the data corresponding to the command are received from the host 110, the memory system 120 may perform a write operation to store the received data in the memory device 122.

At step S370a, a flushing operation may be performed. Specifically, when the data received from the host 110 is stored in the memory device 122, the memory system 120 may change the LBA mapping table which is cached to indicate the position (address) where the data is stored. At this time, the memory system 120 may perform a flushing operation to store the change of the cached LBA mapping table in the memory device 122.

In an embodiment, the memory system 120 may perform the flushing operation through a round-robin journaling method. For example, when a trigger condition is satisfied, the memory system 120 may sequentially perform the flushing operation on a segment basis. When the trigger condition is satisfied, it may indicate that a predetermined number or more of write operations have been performed. The segment may correspond to each of LBA mapping tables, which are obtained through grouping information included in the entire LBA mapping table according to a preset reference value. For example, when the entire LBA mapping table includes 100 pieces of mapping information, the 100 pieces of mapping information may be grouped according to a preset reference value of 10. In this case, 10 segments may be formed. At this time, the memory device 122 may sequentially flush the 10 segments whenever the trigger condition is satisfied.

Figure 3B:
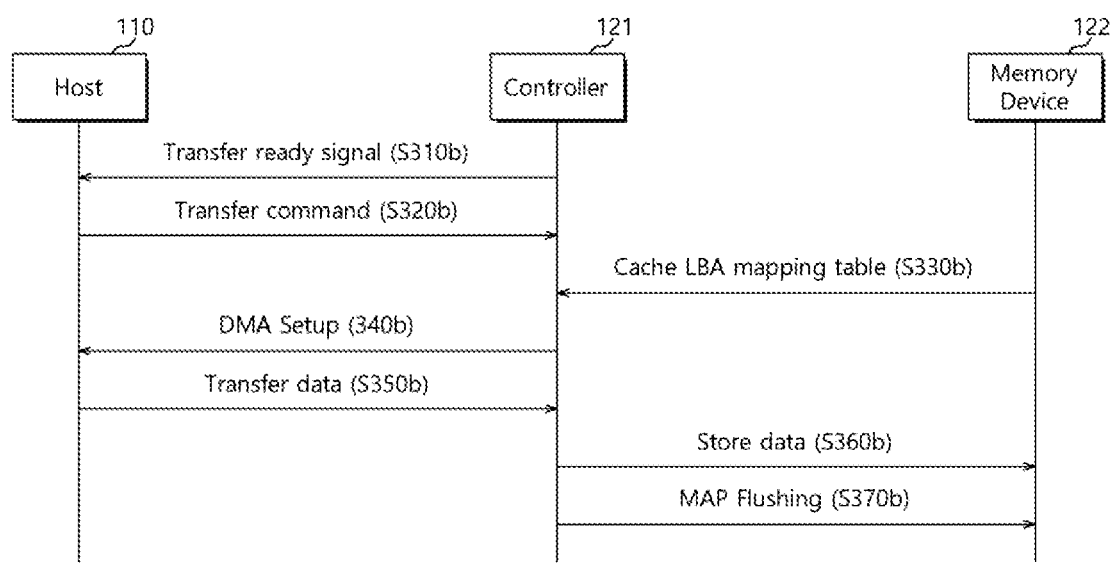
FIG. 3B is a diagram for describing the operating method for the memory system illustrated in FIG. 3A.

FIG. 3B is a diagram for describing the operating method for the memory system 120 illustrated in FIG. 3A.

Referring to FIG. 3B, a ready signal may be transferred to the host 110 at step S310b. Specifically, when the memory system 120 is powered on by driving power applied thereto, the controller 121 may start a booting operation of loading firmware required for driving. When the booting operation is completed, the controller 121 may transfer the ready signal to the host 110 in order to inform the host 110 of the completion of the booting operation.

At step S320b, a command may be transferred from the host 110. Specifically, the host 110 may receive the ready signal from the controller 121, the ready signal informing the host 110 that the memory system 120 is ready to process a request of the host 110. When the ready signal is received, the host 110 may transfer the command, which is to be processed through the memory system 120, to the controller 121.

At step S330b, the LBA mapping table may be cached to the memory 220. Specifically, when the command is received from the host 110, the controller 121 may load the LBA mapping table required for processing the received command from the system region of the memory device 122, and cache the LBA mapping table to the memory 220.

At step S340b, a DMA setup may be transferred to the host 110. Specifically, the controller 121 may transfer the DMA setup to the host 110 such that the host 110 can transfer data, which are to be processed through the memory system 120, to the memory system 120.

At step S350b, the data may be transferred from the host 110. Specifically, when the DMA setup is received from the controller 121, the host 110 may transfer the data, which are to be processed through the memory system 120 according to the received DMA setup, to the data buffer of the controller 121.

At step S360b, the data may be stored in the memory device 122. Specifically, the controller 121 may store the data received from the host 110 in the memory device 122.

At step S370b, the LBA mapping table may be flushed from the memory 220 into the memory device 122. Specifically, the controller 121 may perform a flushing operation of storing mapping information of the cached LBA mapping table in the system region of the memory device 122, the mapping information being changed while the data received from the host 110 are processed.

Figure 4A:
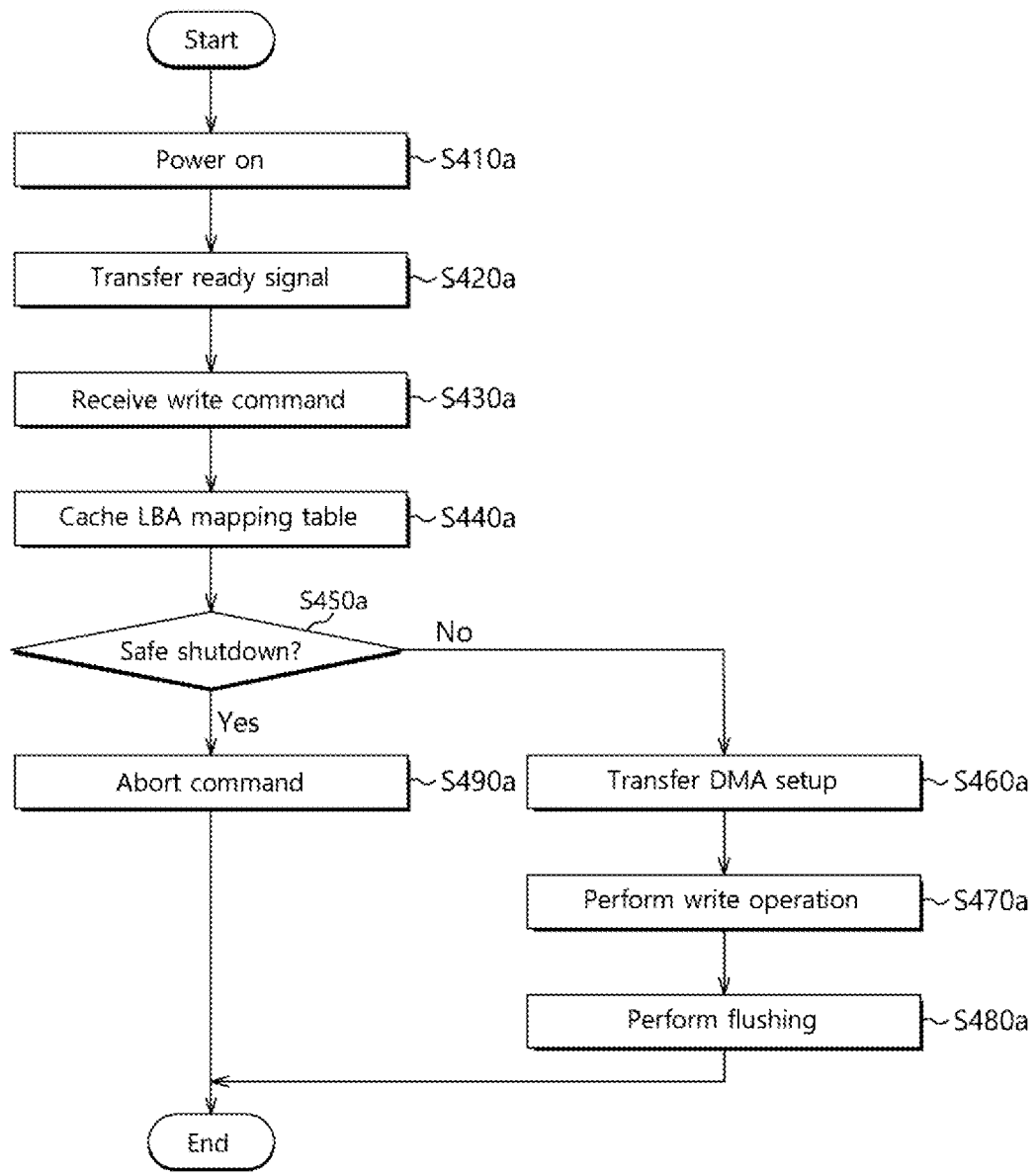
FIG. 4A is a flowchart illustrating an operating method for a memory device in accordance with another embodiment.

FIG. 4A is a flowchart illustrating an operating method for the memory system 120 in accordance with an embodiment, when a safe shutdown occurs.

In the following descriptions, the case in which the operating method is performed by the memory system 120 will be exemplified. Obviously, however, the operating method may be performed by the controller 121 or the processor 210.

Referring to FIG. 4A, the memory system 120 may be powered on at step S410a. Specifically, the memory system 120 may be powered on when driving power is applied.

In an embodiment, the driving power applied to the memory system 120 may be applied from the PMU within the memory system 120.

In an embodiment, the driving power applied to the memory system 120 may be applied from an external device such as the host 110.

At step S420a, a ready signal may be transferred to the host 110. Specifically, after the memory system 120 is powered on, the memory system 120 may load firmware required for driving, and start a booting operation. When the memory system 120 is ready to receive a command from the host 110, the memory system 120 may transfer the ready signal to the host 110 in order to inform the host 110 that the memory system 120 is ready.

At step S430a, a command may be received from the host 110. Specifically, the memory system 120 may receive the command from the host 110. When the command is received from the host 110, the memory system 120 may start preparing for the execution of the received command.

In an embodiment, the command received from the host 110 may change the LBA mapping table. For example, the memory system 120 may receive a write command, trim command or the like from the host 110.

At step S440a, the LBA mapping table may be cached to the memory 220. Specifically, the LBA mapping table stored in the memory system 120 may be cached to the memory 220 of the controller 121.

In an embodiment, when the command is received from the host 110, the memory system 120 may perform an operation of caching the LBA mapping table.

In an embodiment, the memory system 120 may cache the entire LBA mapping table to the memory 220 of the controller 121.

In an embodiment, the memory system 120 may cache the LBA mapping table from the LBA mapping table storage region included in the system region of the memory device 122 to the memory 220 of the controller 121.

At step S450a, the memory system 120 may check whether a safe shutdown occurs. Specifically, the memory system 120 may check a safe shutdown signal. When the safe shutdown signal is checked, the memory system 120 may start preparing for a power-off.

In an embodiment, the memory system 120 may receive the safe shutdown signal from the host 110, the PMU 260 or the like. When the safe shutdown signal is received, the memory system 120 may determine that a safe shutdown will occur, and start preparing for a power-off.

In an embodiment, the memory system 120 may check whether a safe shutdown occurs during the overall operations of the memory system 120. For example, the memory system 120 may not only check whether a safe shutdown occurs, after step S440a, but also check whether a safe shutdown occurs, during the overall operations of the memory system 120.

When no safe shutdown occurs, steps S460a to S480a which are operations of the memory system 120 may correspond to steps S350a to S370a in FIG. 3A. Thus, the detailed descriptions thereof will be omitted herein.

At step S490a, the command may be aborted when safe shutdown occurs. Specifically, when the safe shutdown signal is checked before the transfer of the DMA setup is completed, the memory system 120 may not transfer the DMA setup to the host 110. When the safe shutdown signal is checked before the transfer of the DMA setup is completed, the memory system 120 may abort the command received at step S430a, or not execute the command. At this time, since the memory system 120 did not execute the command received from the host 110, the cached LBA mapping table may not be changed. Therefore, although a safe shutdown of the memory system 120 occurs before the DMA setup is transferred, a flushing operation for the cached LBA mapping table may not be required. Thus, since the number of write operations of the memory system 120 can be minimized, the lifespan of the memory system 120 can be extended.

Figure 4B:
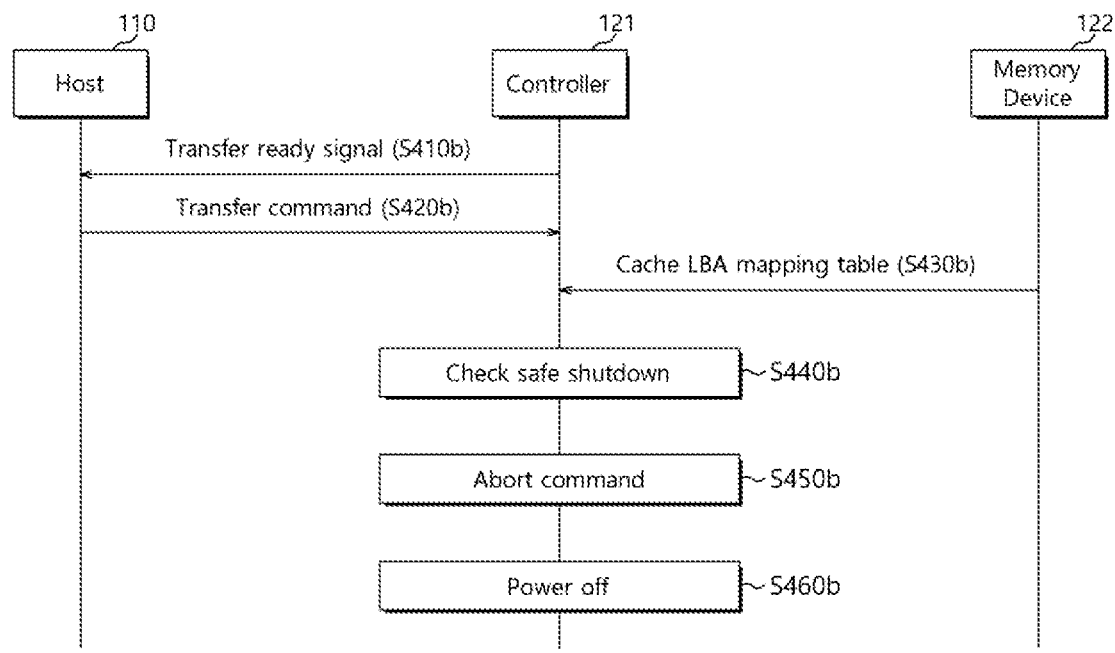
FIG. 4B is a diagram for describing the operating method for the memory system illustrated in FIG. 4A.

FIG. 4B is a diagram for describing the operating method for the memory system 120 illustrated in FIG. 4A.

FIG. 4B illustrates the case in which a safe shutdown occurs in the operating method of FIG. 4A.

At step S410b, a ready signal may be transferred to the host 110. Specifically, when the memory system 120 is powered on by driving power applied thereto, the controller 121 may start a booting operation of loading firmware required for driving. When the booting operation is completed, the controller 121 may transfer the ready signal to the host 110 in order to inform the host 110 of the completion of the booting operation.

At step S420b, a command may be transferred from the host 110. Specifically, the host 110 may receive the ready signal from the controller 121, the ready signal informing the host 110 that the memory system 120 is ready to process a request of the host 110. When the ready signal is received, the host 110 may transfer a command, which is to be processed through the memory system 120, to the controller 121.

At step S430b, the LBA mapping table may be cached to the memory 220. Specifically, when the command is received from the host 110, the controller 121 may load the LBA mapping table required for processing the received command from the system region of the memory device 122, and cache the LBA mapping table.

At step S440b, the memory system 120 may check whether a safe shutdown occurs. Specifically, when the safe shutdown signal is received from the host 110, the PMU 260 or the like, the memory system 120 may determine that a safe shutdown will occur. When it is determined that a safe shutdown will occur, the controller 121 may start preparing for a power-off.

At step S450b, the command may be aborted. Specifically, when the safe shutdown signal is checked before the transfer of the DMA setup is completed, the controller 121 may not transfer the DMA setup. When the safe shutdown signal is checked before the transfer of the DMA setup is completed, the controller 121 may abort the command received at step S420b, or not execute the command. At this time, since the controller 121 did not execute the command received from the host 110, the cached LBA mapping table may not be changed. Therefore, although a safe shutdown of the memory system 120 occurs before the DMA setup is transferred, a flushing operation for the cached LBA mapping table may not be required. Thus, since the number of write operations of the memory system 120 can be minimized, the lifespan of the memory system 120 can be extended.

At step S460b, the memory system 120 may be powered off. Specifically, since the controller 121 did not transfer the DMA setup to the host 110, the controller 121 may not perform a flushing operation of changing the LBA mapping table stored in the system region of the memory device 122, but end the operation of the memory system 120.

In accordance with the present embodiment, the lifetime of the memory device can be effectively extended.

While various embodiments have been described above, it will be understood to those skilled in the art that the embodiments described are examples only. Accordingly, the memory system and the operating method thereof, which are described herein, should not be limited based on the described embodiments.

Figure 5:
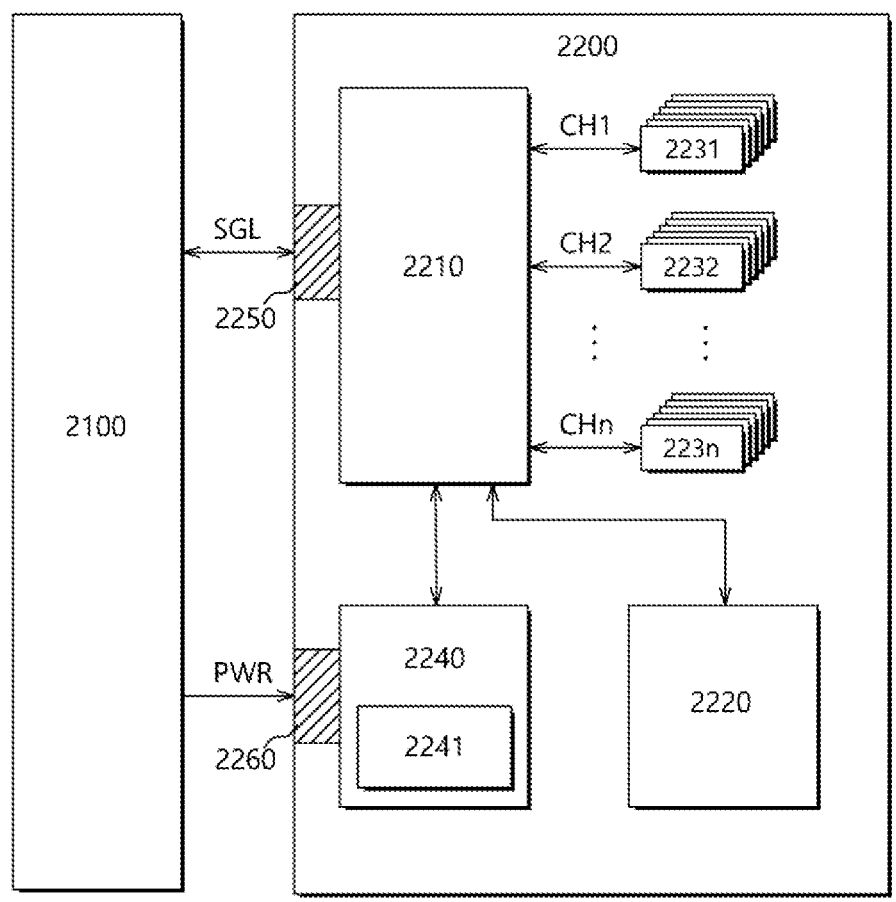
FIG. 5 and FIG. 6 are block diagrams illustrating a data processing system including a solid state drive (SSD) in accordance with an embodiment.
Figure 6:
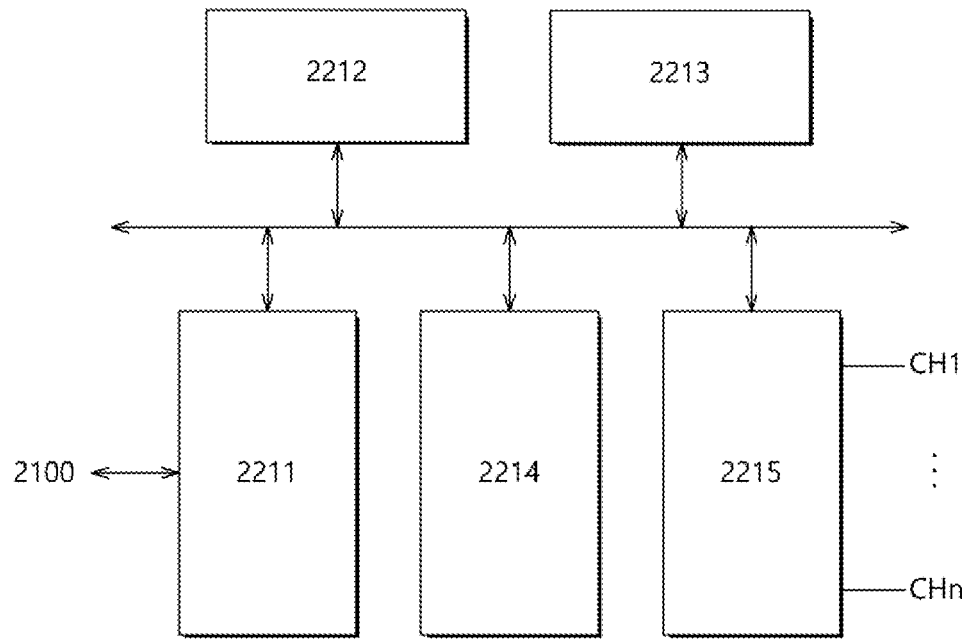

FIG. 5 and FIG. 6 are diagrams illustrating an example of a data processing system including a solid state drive (SSD) in accordance with an embodiment. Referring to FIG. 5, a data processing system 2000 may include a host device 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control general operations of the SSD 2200. Referring to FIG. 6, the controller 2210 may include a host interface 2211, a control component 2212, a random access memory 2213, an error correction code (ECC) component or circuit 2214, and a memory interface 2215.

The host interface 2211 may exchange a signal SGL with the host device 2100 through the signal connector 2250. The signal SGL may include a command, an address, data, and so forth. The host interface 2211 may interface the host device 2100 and the SSD 2200 according to the protocol of the host device 2100. For example, the host interface 2211 may communicate with the host device 2100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e or PCIe) and universal flash storage (UFS).

The control component 2212 may analyze and process a signal SGL inputted from the host device 2100. The control component 2212 may control operations of internal function blocks according to a firmware or a software for driving the SSD 2200. The random access memory 2213 may be used as a working memory for driving such a firmware or software.

The error correction code (ECC) component or circuit 2214 may generate the parity data of data to be transmitted to the nonvolatile memory devices 2231 to 223n. The generated parity data may be stored together with the data in the nonvolatile memory devices 2231 to 223n. The error correction code (ECC) component 2214 may detect an error of the data read out from the nonvolatile memory devices 2231 to 223n, based on the parity data. If a detected error is within a correctable range, the error correction code (ECC) component 2214 may correct the detected error.

The memory interface 2215 may provide control signals such as commands and addresses to the nonvolatile memory devices 2231 to 223n, according to control of the control component 2212. Moreover, the memory interface 2215 may exchange data with the nonvolatile memory devices 2231 to 223n, according to control of the control component 2212. For example, the memory interface 2215 may provide the data stored in the buffer memory device 2220, to the nonvolatile memory devices 2231 to 223n, or provide the data read out from the nonvolatile memory devices 2231 to 223n, to the buffer memory device 2220.

The buffer memory device 2220 may temporarily store data to be stored in the nonvolatile memory devices 2231 to 223n. Further, the buffer memory device 2220 may temporarily store the data read out from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to each channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include large capacity capacitors.

The signal connector 2250 may be configured by various types of connectors depending on an interface scheme between the host device 2100 and the SSD 2200.

The power connector 2260 may be configured by various types of connectors depending on a power supply scheme of the host device 2100.

Figure 7:
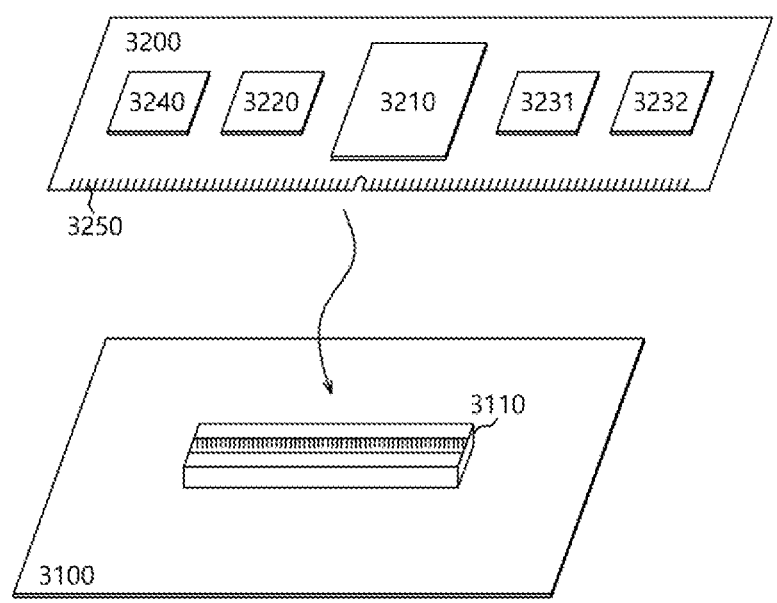
FIG. 7 is a diagram illustrating a data processing system including a memory system in accordance with an embodiment.

FIG. 7 is a diagram illustrating an example of a data processing system including a memory system in accordance with an embodiment. Referring to FIG. 7, a data processing system 3000 may include a host device 3100 and a memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 2210 shown in FIG. 6.

The buffer memory device 3220 may temporarily store data to be stored in the nonvolatile memory devices 3231 and 3232. Further, the buffer memory device 3220 may temporarily store the data read out from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and so forth, and power may be transferred between the host device 3100 and the memory system 3200. The connection terminal 3250 may be configured into various types depending on an interface scheme between the host device 3100 and the memory system 3200. The connection terminal 3250 may be disposed on any one side of the memory system 3200.

Figure 8:
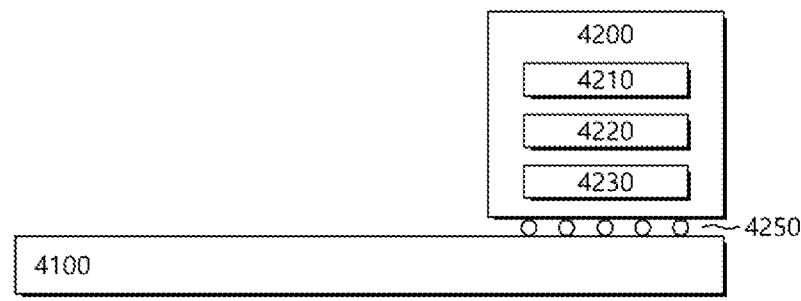
FIG. 8 is a diagram illustrating a data processing system including a memory system in accordance with an embodiment.

FIG. 8 is a diagram illustrating an example of a data processing system including a memory system in accordance with an embodiment. Referring to FIG. 8, a data processing system 4000 may include a host device 4100 and a memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 1210 shown in FIG. 6.

The buffer memory device 4220 may temporarily store data to be stored in the nonvolatile memory device 4230. Further, the buffer memory device 4220 may temporarily store the data read out from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as a storage medium of the memory system 4200.

Figure 9:
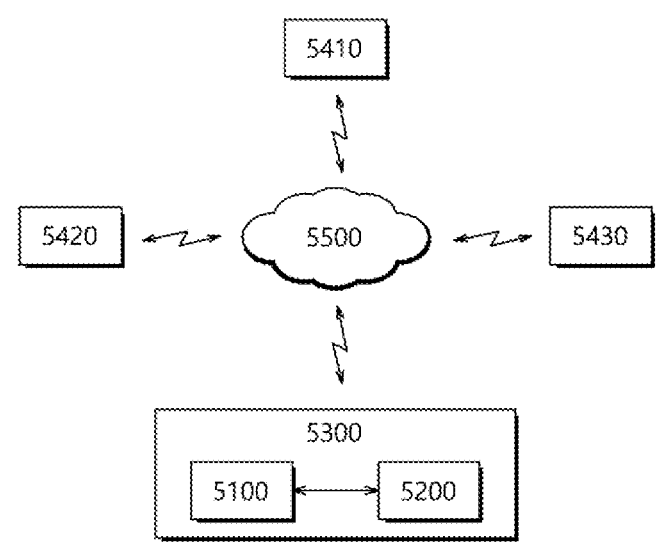
FIG. 9 is a block diagram illustrating a network system including a memory system in accordance with an embodiment.

FIG. 9 is a diagram illustrating an example of a network system including a memory system in accordance with an embodiment. Referring to FIG. 9, a network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and a memory system 5200. The memory system 5200 may be constructed by memory system 100 shown in FIG. 1, the SSD 2200 shown in FIG. 5, the memory system 3200 shown in FIG. 7 or the memory system 4200 shown in FIG. 8.

Figure 10:
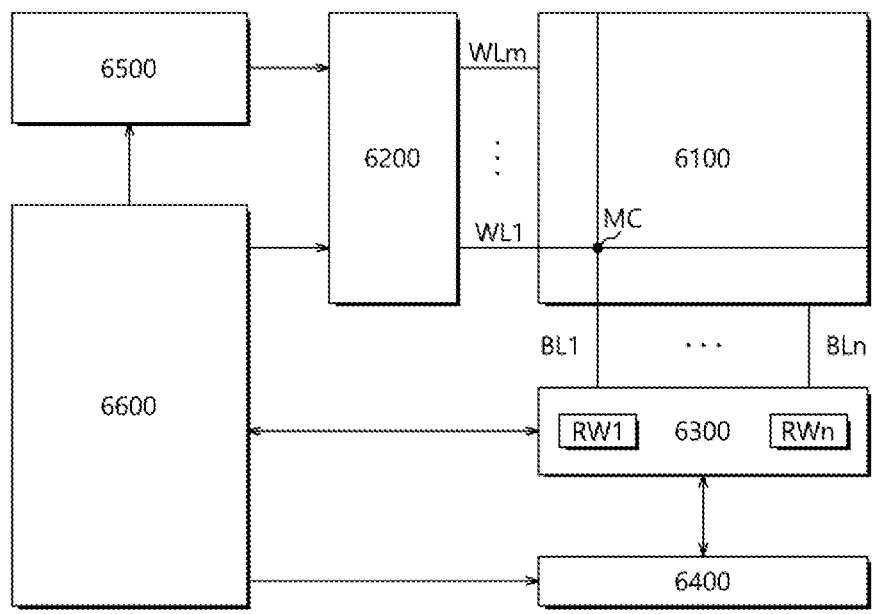
FIG. 10 is a block diagram illustrating a nonvolatile memory device included in a memory system in accordance with an embodiment.

FIG. 10 is a block diagram illustrating an example of a nonvolatile memory device included in a memory system in accordance with an embodiment. Referring to FIG. 10, a nonvolatile memory device 6000 may include a memory cell array 6100, a row decoder 6200, a data read/write block 6300, a column decoder 6400, a voltage generator 6500, and a control logic 6600.

The memory cell array 6100 may include memory cells MC which are arranged at areas where word lines WL1 to WLm and bit lines BL1 to BLn intersect with each other.

The row decoder 6200 may be coupled with the memory cell array 6100 through the word lines WL1 to WLm. The row decoder 6200 may operate according to the control of the control logic 6600. The row decoder 6200 may decode an address provided from an external device (not shown). The row decoder 6200 may select and drive the word lines WL1 to WLm, based on a decoding result. For instance, the row decoder 6200 may provide a word line voltage provided from the voltage generator 6500, to the word lines WL1 to WLm.

The data read/write block 6300 may be coupled with the memory cell array 6100 through the bit lines BL1 to BLn. The data read/write block 6300 may include read/write circuits RW1 to RWn respectively corresponding to the bit lines BL1 to BLn. The data read/write block 6300 may operate according to control of the control logic 6600. The data read/write block 6300 may operate as a write driver or a sense amplifier according to an operation mode. For example, the data read/write block 6300 may operate as a write driver which stores data provided from the external device, in the memory cell array 6100 in a write operation. For another example, the data read/write block 6300 may operate as a sense amplifier which reads out data from the memory cell array 6100 in a read operation.

The column decoder 6400 may operate according to the control of the control logic 6600. The column decoder 6400 may decode an address provided from the external device. The column decoder 6400 may couple the read/write circuits RW1 to RWn of the data read/write block 6300 respectively corresponding to the bit lines BL1 to BLn with data input/output lines (or data input/output buffers), based on a decoding result.

The voltage generator 6500 may generate voltages to be used in internal operations of the nonvolatile memory device 6000. The voltages generated by the voltage generator 6500 may be applied to the memory cells of the memory cell array 6100. For example, a program voltage generated in a program operation may be applied to a word line of memory cells for which the program operation is to be performed. For still another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 6600 may control general operations of the nonvolatile memory device 6000, based on control signals provided from the external device. For example, the control logic 6600 may control the read, write and erase operations of the nonvolatile memory device 6000.

What is claimed is:
1. A memory system comprising:
a memory device comprising a plurality of memory cells storing data, and configured to perform one or more of a write operation, read operation and erase operation on the plurality of memory cells; and
a controller configured to control an operation of the memory device, wherein the controller is configured to:
cache a logical block addressing (LBA) mapping table from the memory device when the memory system is powered on by driving power applied thereto;
transfer a direct memory access (DMA) setup to a host when the LBA mapping table is cached;
check whether a safe shutdown occurs;
receive a command from the host, and abort the command when the safe shutdown occurs before the transfer of the DMA setup is completed; and
execute the command when the transfer of the DMA setup is completed.

2. The memory system according to claim 1, wherein the controller is configured to control the memory device to flush the LBA mapping table, which is changed depending on the execution result of the command, to an LBA mapping table storage region, when the transfer of the DMA setup is completed.

3. The memory system according to claim 2, wherein the controller does not execute the command when the command is aborted.

4. The memory system according to claim 2, wherein the controller configured to control the memory device to flush the cached LBA mapping table on a segment basis which is set by dividing the LBA mapping table according to a preset reference value.

5. The memory system according to claim 2, wherein the controller is configured to control the memory system to flush the LBA mapping table through a round-robin journaling method.

6. The memory system according to claim 1, wherein the power-on indicates that the driving power is applied after the memory system is normally turned off.

7. The memory system according to claim 1, wherein the command comprises a command which accompanies a change of the cached LBA mapping table.

8. The memory system according to claim 1, wherein the command comprises one or more of a write command and a trim command.

9. An operating method for a memory system having a controller, comprising:
powering on the memory system as driving power is applied;
receiving, by the controller, a command from the host;
caching, by the controller, an LBA mapping table from an LBA mapping table storage region to a memory when the memory system is powered on;
transferring, by the controller, a DMA setup to a host when the LBA mapping table is cached;
checking, by the controller, whether a safe shutdown occurs;
aborting, by the controller, the command when the safe shutdown occurs before the transfer of the DMA setup is completed; and
executing, by the controller, the command when the transfer of the DMA setup is completed.

10. The operating method according to claim 9, further comprising:
flushing, by the controller, the LBA mapping table to the LBA mapping table storage region, the LBA mapping table being changed depending on the execution result of the command.

11. The operating method according to claim 10,
wherein the executing of the command, the command is not executed when the command is aborted.

12. The operating method according to claim 10, wherein in the flushing of the LBA mapping table to the LBA mapping table storage region, the cached LBA mapping table is flushed on a segment basis which is set by dividing the LBA mapping table according to a preset reference value.

13. The operating method according to claim 10, wherein the flushing of the LBA mapping table is performed through a round-robin journaling method.

14. The operating method according to claim 9, wherein in the powering on the memory system, the driving power is applied after the memory system is normally turned off.

15. The operating method according to claim 9, wherein the command comprises one or more of a write command and a trim command.

16. An operating method of a controller for controlling an operation of a memory device, the method comprising:
caching a logical block addressing (LBA) mapping table from the memory device in response to a command from a host upon being powered on; and
ignoring the command without flushing the cached LBA mapping table for a power-off when a safe shutdown occurs before providing a direct memory access (DMA) setup to the host.

* * * * *